US006516565B1

(12) United States Patent
Fima

(10) Patent No.: US 6,516,565 B1
(45) Date of Patent: Feb. 11, 2003

(54) AIRBORNE SEED POUCH DELIVERY SYSTEM

(76) Inventor: Raoul G. Fima, 2392 Fire Mountain Dr., Oceanside, CA (US) 92054

( * ) Notice: Subject to any disclaimer, the term of this patent is extended or adjusted under 35 U.S.C. 154(b) by 0 days.

(21) Appl. No.: 09/968,836

(22) Filed: Oct. 1, 2001

Related U.S. Application Data

(63) Continuation-in-part of application No. 09/819,405, filed on Mar. 29, 2001, which is a continuation-in-part of application No. 09/796,973, filed on Mar. 2, 2001.

(51) Int. Cl.[7] .................................................. A01G 9/02
(52) U.S. Cl. ............................................... 47/74; 47/84
(58) Field of Search ............................ 47/74, 65.5, 73, 47/77, 84

(56) References Cited

U.S. PATENT DOCUMENTS 1,446,113 A * 2/1923 Blackwell
2,306,321 A * 12/1942 Robers
2,528,986 A * 11/1950 Adams
2,757,841 A * 8/1956 Chapman
3,273,284 A * 9/1966 Anagnostou
3,755,962 A * 9/1973 Walters et al. .............. 102/385
3,914,900 A * 10/1975 Bigelow et al. ............ 428/913
4,333,265 A * 6/1982 Arnold ....................... 111/920
5,031,356 A * 7/1991 Thomsen ....................... 47/47
5,194,030 A * 3/1993 LeBoeuf et al. ............ 434/433
5,210,975 A * 5/1993 Beckerman .................... 47/56
5,799,439 A * 9/1998 MacGregor ................. 424/456
6,105,308 A * 8/2000 Ellegaard ................. 47/58.1 R

FOREIGN PATENT DOCUMENTS

JP 10-42703 * 2/1998

* cited by examiner

*Primary Examiner*—Peter M. Poon
*Assistant Examiner*—Jeffrey L. Gellner
(74) *Attorney, Agent, or Firm*—William B Noll

(57) ABSTRACT

A biodegradable seed pouch having in a preferred embodiment the ability to partially penetrate the ground when delivered by a slow moving airborne system. The pouch is a small package which contains the tree seed or seeds, along with their soil and nutrients. These are contained in a biodegradable skin which is dropped from the slow flying airborne system from altitudes just high enough to avoid contact with the local terrain. The inside of the pouch skin may be coated with a mixture of ground cover seeds and nutrients immersed within a biodegradable adhesive. The pouch, spherical or conical in shape, includes a flared open end formed by constricting the skin. Additionally, contained within the pouch, in a first embodiment, is an elongated member vertically oriented therein, where the lower end is pointed to facilitate penetration of the ground. The upper end is flared essentially laterally to facilitate maintaining the member within said soil and to assist in releasing the skin at impact. Finally, for this first embodiment a central hole in the member may be included to receive a seed to be planted in the ground. A second embodiment comprises a biodegradable pod that is dynamically shaped to allow for a relatively slow descent when delivered by the airborne system.

8 Claims, 3 Drawing Sheets

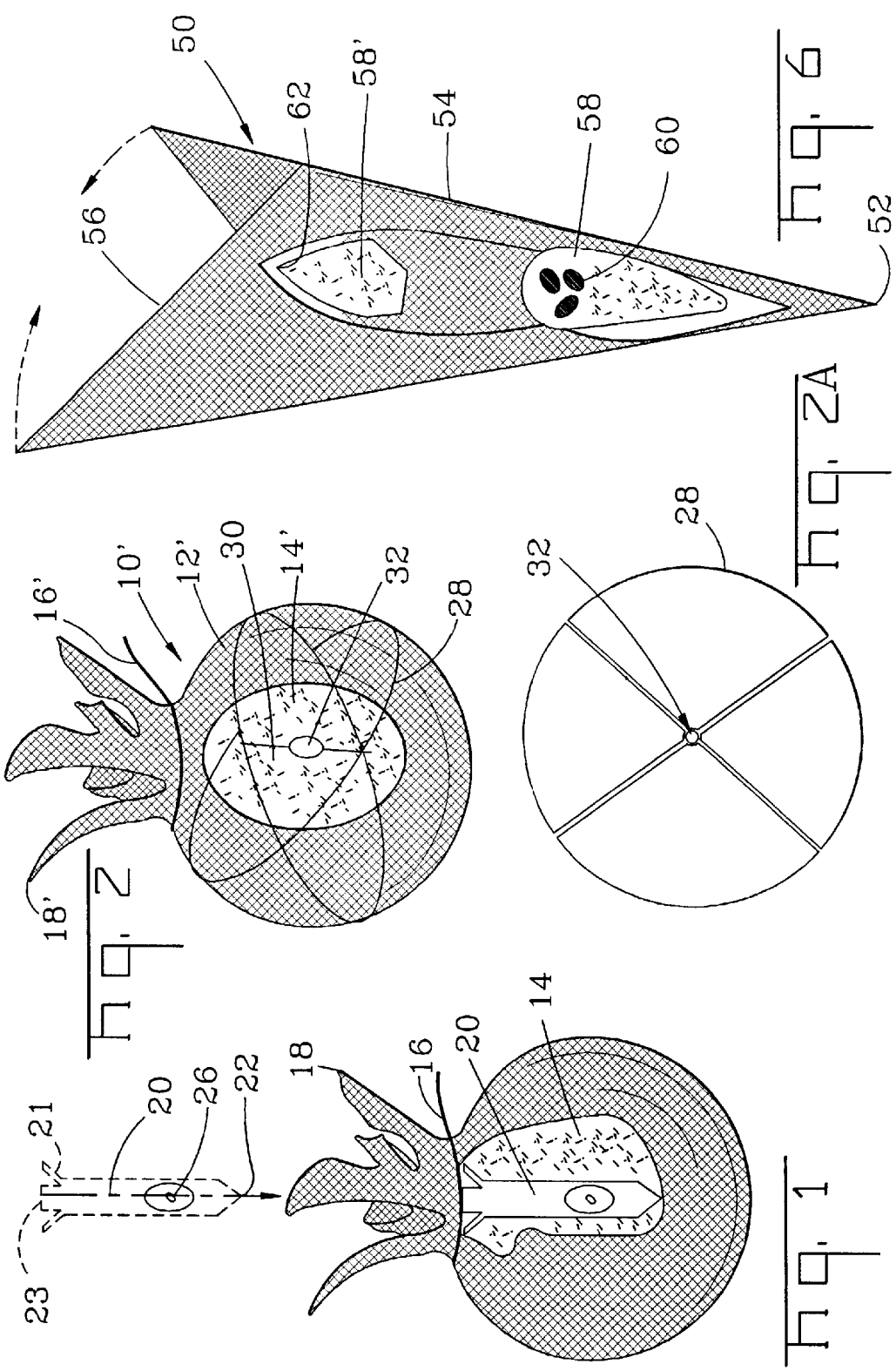

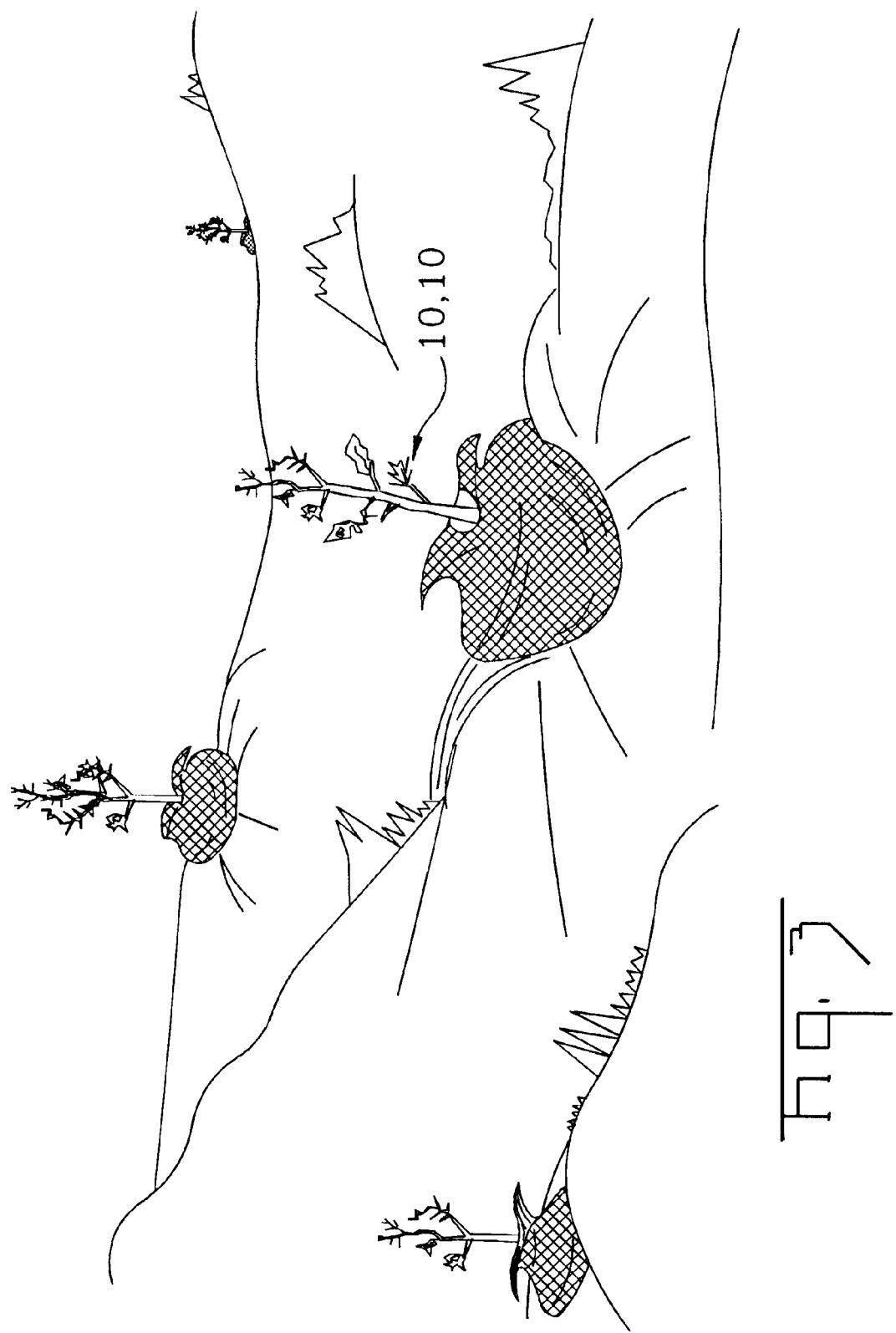

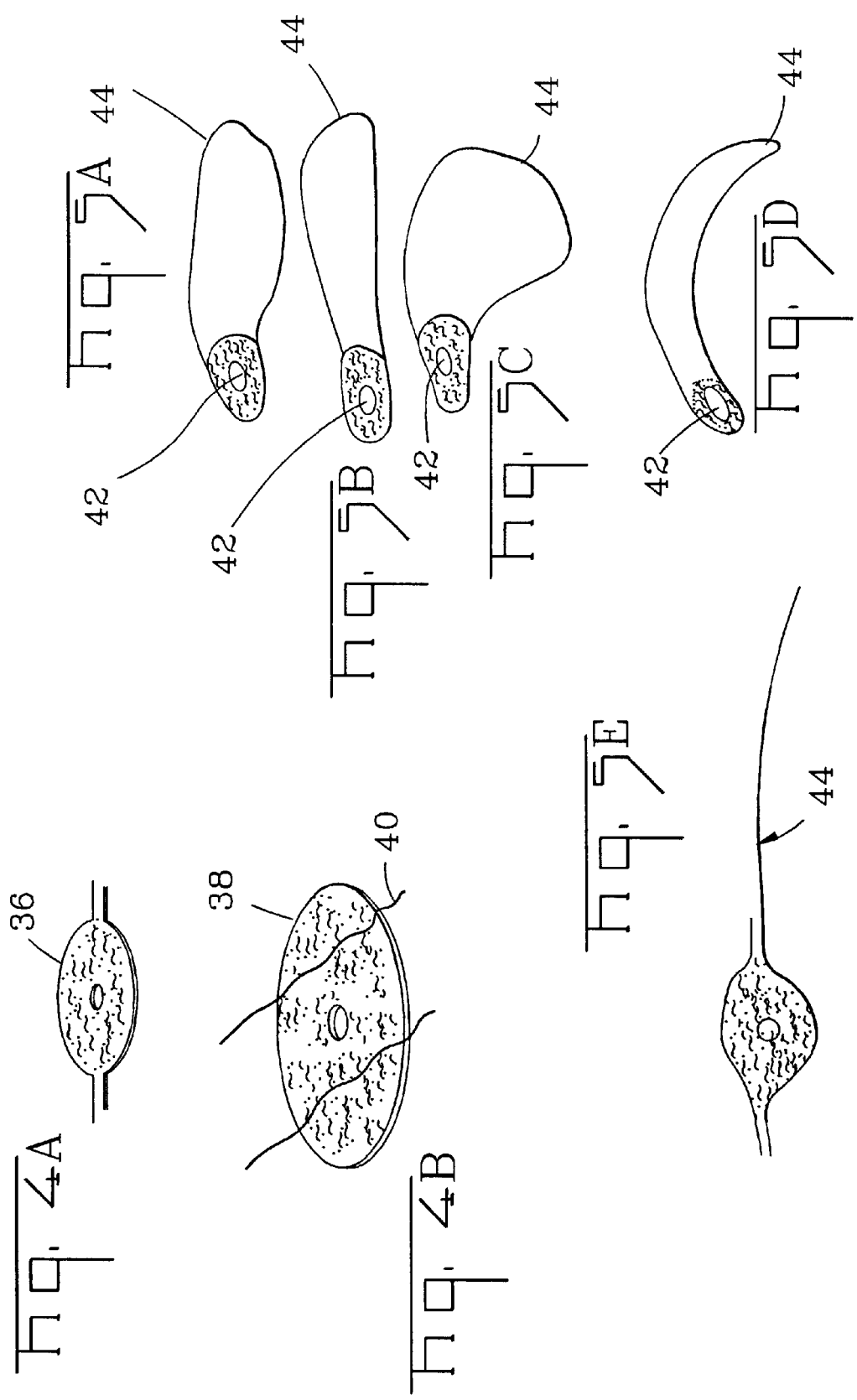

AIRBORNE SEED POUCH DELIVERY SYSTEM

RELATED APPLICATIONS

This application is a continuation-in-part of Ser. No. 09/819,405, filed Mar. 29, 2001, which in turn is a continuation-in-part of Ser. No. 09/796,973, filed Mar. 2, 2001, where the present inventor is a co-inventor of said applications.

FIELD OF THE INVENTION

This invention is directed to the field of planting seeds in vast areas of land, more particularly to an airborne delivery system that drops pouches of bagged seeds from a slow moving aircraft, such as a helicopter, lighter-than-air airship, and related vehicles.

BACKGROUND OF THE INVENTION

The present invention relates to a new system for delivering seed pouches to remote areas, such as those areas that may have been subjected to a devastating fire. The co-pending applications noted above, the contents of which are incorporated herein in their entirety, teach a lighter-than-air airship having as a primary purpose the fighting of fires with an essentially endless supply of water or liquid fire suppressant. The disclosed lighter-than-air airship represents a preferred means for delivering the seed pouches.

Forest fire destruction can have an enormous impact on the environment. In order to replace the forest, tree seeds or seedlings have to be planted, usually by hand. This can be a tedious and expensive task. Further, even to get to the seedling stage, can be a long and labor intensive job. The seedlings have to be grown in a nursery or laboratory, then handled and transplanted several times before they are of a size to be placed in a pouch for manual planting. Further, seedlings would require special containment and conveyor systems to reduce breakage and root damage during an attempt at airborne delivery. In contrast, as will become apparent hereafter, seed pouches can be handled roughly and do not require ancillary equipment.

The present invention provides a unique system to reforest a devastated area without the tedious work of preparing seedlings and manually planting same, particularly in areas that are not readily accessible to vehicles. The manner by which the system of this invention can reforest remote areas will become apparent in the further description, particularly when considered in conjunction with the accompanying drawings.

SUMMARY OF THE INVENTION

This invention relates to a reforestation delivery system by air drops from slow moving aircraft and other vehicles, and to a biodegradable, seed and nourishment containing pouch that partially penetrates the ground to allow the seed to germinate and grow. A preferred pouch comprises a generally cone or sphere-like shape having a biodegradable cover, such as a burlap material, which may be coated with ground cover seeds and nutrients. The cover is glued or tied at the top so that the corners of the cover material flare outward to help facilitate a directional fall. Within the pouch there is provided (a) potting soil, nutrients and sand, as appropriate for the area to be planted, (b) and in a preferred embodiment an elongated stake or nutrient stick vertically oriented within the soil and sand, where the lower end is pointed to help facilitate penetration of the ground, an upper end that may be flared to hold the stake or nutrient stick within the pouch, and a central hole to contain the seed(s) to be planted. In dropping the pouch from a slow moving airborne system and the like, the flared end acts like the blades of a helicopter to maintain a proper orientation and controlled descent of the pouch to penetrate or spread on the ground. Optionally, the lower end of the pouch may be soaked with water, or even flash frozen, to help in the germination of the seed(s).

Accordingly, an object of this invention is to provide a biodegradable, seed(s) containing pouch to be dropped from a slow moving aircraft or related vehicle, to reforest remote areas not readily accessible to ground vehicles.

Another object hereof is the provision of an elongated stake within the pouch to receive the seed(s) and facilitate penetration of the ground where planting is desired.

A further object of the invention is the provision of a biodegradable pouch cover that helps facilitate in the spreading and nurturing of ground cover seeds.

Still another object is a seed(s) pouch that features a flared top to help maintain the orientation of the pouch as it falls from the airborne system, etc.

These and other objects of the invention will become more apparent from a reading of the following specification, particularly when read in conjunction with the accompanying drawings.

BRIEF DESCRIPTION OF DRAWINGS

FIG. 1 is a side view, with portions removed to illustrate internal details, for a preferred embodiment for the biodegradable seed(s) pouch of this invention, where a feature thereof is a vertically oriented stake for receiving the seed(s) to be planted.

FIG. 2 is a side view, with portions removed to illustrate internal details, of a second embodiment for the biodegradable seed pouch of this invention, where a feature thereof is a pair of angularly oriented, nutrient modified disks or wafers, with a hole at the center thereof for receiving the seed(s).

FIG. 2A is partial end view, taken along the plane of one of the disks or wafers of the embodiment of FIG. 2, showing the seed(s) receiving hole in the middle of said disks or wafers.

FIG. 3 is a simplified perspective view of a number of seed pouches that have been delivered and germinated by the system hereof, as the biodegradable pouches may be after a period of time.

FIGS. 4A and 4B are simplified views to illustrate alternate embodiments for a biodegradable pod, such as may be made from known biodegradable materials.

FIGS. 5A through 5E are simplified views to illustrate different aerodynamic shapes to produce a slow, relatively free falling biodegradable pod for the system of this invention.

FIG. 6 is an alternate embodiment for a biodegradable seed pouch of this invention, where said embodiment is cone shaped to facilitate penetration of the ground when dropped from a slow moving airborne delivery system.

DETAILED DESCRIPTION OF PREFERRED EMBODIMENTS

The present invention is directed to a unique and effective system for delivering seeds to remote areas of land, particularly those areas not readily accessible by ground vehicles, and to facilitate the germination of said seeds in the ground. The seed(s) are intended to be delivered by lighter-than-air airships, or helicopters, which can readily fly over such remote areas. The system includes several mechanisms to contain the seed(s) and quantity of nutrient bearing soil in a pouch or pod that can be conveniently dropped from a slow moving air craft for penetrating or spreading on the ground. The several embodiments of the invention will now be described with regard to the accompanying Figures, where like reference numerals represent like components or features throughout the several views.

Turning first to FIG. 1, illustrating a first embodiment for the delivery of seed(s) to remote areas, such as that which has been devastated by fire, the delivery system 10 comprises a biodegradable skin 12 forming a pouch, such as a burlap fabric material, that contains a nutrient containing soil 14, preferably a mixture of sand and soil, where the skin 12 is wrapped around the soil in a generally spherical shape, though other shapes, as discussed later, may be employed. In this first embodiment, the spherical shape may be about the size of a standard baseball, on the order of 2½ to 3 inches in diameter. The skin 12, where the inside surface may be coated with a mixture of ground cover seeds and nutrients immersed in a biodegradable adhesive, may be secured thereabout by gluing or a fastening element 16, such as a metal wire, string, or clip, where the free ends 18 of the skin are flared outwardly to create a drag along the side of the pouch. In cases where loose weave patterns in the skin fabric prevent proper ground cover and nutrient adhesion, a liner of biodegradable tissue may be used as an inner skin liner. In either case, for the baseball sized sphere, a square of burlap material, about 8×8 inches, will leave sufficient material at the respective corners to form the flared ends 18. This alters the dynamics of the pouch and thus helps to stabilize the pouch as it descends to the ground. A preferred delivery mechanism for said seed(s) containing pouches is a lighter-than air airship as more fully described and illustrated in U.S. Ser. No. 09/819,405, filed Mar. 3, 2001, the contents of which are incorporated herein in their entirety.

Since a feature of the preferred embodiment is its ability to at least partially penetrate the ground, the pouch may contain an elongated, rigid stake element 20, shown in phantom lines in FIG. 1, where the lower end is pointed 22 to facilitate its entry into the ground. The upper end 23 is flared upwardly and outwardly 24, in a generally lateral fashion, where the flared ends or barbs may be by a variety of means, such as cut and bend, splitting, twisting or punching out. In any case, the purpose of the flared ends is to help hold the rigid stake element 20 from backing out of the pouch at impact, by interlocking with the cover material at the tie, i.e. interacting with the constricted open end of the pouch. The edges of the barbs or flared ends may be sharpened to provide a pinch cutter to release the skin or cover fastening element 16, as the pouch is compressed. Also, upward facing barbs may be included at the pointed end 22 to help eliminate pouch bounce. Finally, the overall length of the rigid stake element is at least 30% to less than 100% of the diameter of the generally circular sphere.

A final feature of the rigid stake element 20 is to provide a convenient means to receive and hold a seed(s). This is found in the provision of a central through hole 26, where the seed(s) is held within the hole 26 any number of means. For example, the seed(s) may be held therein by (a) a separately manufactured, biodegradable, self-adhesive cocoon mounted over the hole, (b) a biodegradable paper tape wrapped around the hole containing the seed(s), or (c) a biodegradable self adhesive patch placed over the hole.

While the pointed stake 20 is preferred means to facilitate entry of and penetration of the pouch into the ground, it will be noted that the stake may be eliminated as the weight of the pouch may be sufficient in some cases to allow penetration of the ground for the seeding purposes of this invention. 24 FIGS. 2 and 2A illustrate a second embodiment for the delivery system 10' of this invention. The system therein comprises a biodegradable skin 12' as above, containing a nutrient rich soil 14'. The second embodiment differs by the inclusion of a pair of intersecting, biodegradable, circular disks 28, of a size comparable to the size of the sphere. The respective disks 28 are angularly disposed to one another at angles between about 60 to 120 degrees. Finally, at an approximate center point along the intersection 30, a hole 32 is provided to receive the desired seed(s).

With both of the embodiments of FIGS. 1 and 2, in a dry area or season, the lower portion 34 of the pouch may be soaked with water before dropping the pouch to the ground. For a delayed delivery of water to the seed(s), the absorbed water may be flash frozen, by means known in the art, prior to delivery. In any event, FIG. 3 shows how the system 10, 10' works, after a sufficient germination time, after dropping the pouches.

FIGS. 4A and 4B illustrate two different methods of encapsulating a seed(s) with surrounding soil, for delivery by the practices of this invention. For the embodiment of FIG. 4A, a pair of clam-like shells 36, fabricated of a biodegradable product, such as paper, may be used to contain the seed(s). FIG. 4B shows a similar method, where a pair of biodegradable cover members 38 may be tied 40, crimped or glued together to enclose the seed(s). Externally, the encapsulated seed(s) of FIGS. 4A or 4B may be incorporated into one of the hollow pods of FIGS. 5A through 5E. Specifically, the respective pods are hollow 42 into which the encapsulated seed(s) may be inserted. The extensions 44 therefrom are aerodynamically designed to effect a spinning or other type of movement to control the descent of the pod when dropped by a slow moving aircraft system.

Slow and deliberate air delivery and the relatively recent inventions of biodegradable paper and foam for fast food packaging leads to the possibility of quasi-natural seed dispersal using the distribution capabilities of the lighter-than-air vehicles. Natural seed dispersal comes in many forms such as gliders, parachutes, helicopters and flutter/spinners. FIGS. 5A through 5D shows several variations on these themes. In all cases the seed or seeds and their nutrients and potting soil and sand mixture are encapsulated in the center of a clamshell shaped pod (FIG. 4A) which is biodegradable and covered with an adhesive mixture of ground cover seeds and nutrients. The clamshell 36 can be straight or the edges 38 can be warped (FIG. 5E) to impart a spinning motion during the drop. Other spinner configurations, similar to maple seed asymmetrical helicopters and boomerangs are shown in FIGS. 5C and 5D. These configurations can be automatically die cut and bumped. The seed(s) and their nutrients, potting soil/sand mixture can be placed in the cavity. These methods of seed delivery are more natural than the preferred configuration shown in (FIG. 1) but they do result in longer seed germination times.

FIG. 6 illustrates a second embodiment where the pouch 50 is cone shaped having a sharp point 52 to facilitate penetration of the ground. The skin 54, where portions have been removed to expose internal features, may be a burlap like material or a biodegradable foam, where the top 56 may be temporarily folded over and glued to provide a compact and closed container. Within the pouch 50 are a pair of tapered spikes or darts 58, 58', such as made from iron, where the former facilitates penetration of the ground, and may contain the primary seeds 60 to be planted, and the latter includes a sharp point 62 to help open the glued top 56 upon impact of the pouch with the ground. Surrounding the spikes or darts 58, 58', within the the pouch 50, are ground cover seeds, potting soil, nutrients and moisture.

It is recognized that changes, variations and modifications may be made to the reforestation practices of this invention, particularly by those skilled in the art, without departing from the spirit and scope thereof. Accordingly, no limitation is intended to be imposed thereon except as set forth in the accompanying claims.

What is claimed is:

1. A biodegradable seed pouch having the ability to partially penetrate the ground when delivered by a slow moving air craft system, said pouch comprising:

a.) a biodegradable skin in the general form of a sphere, where said pouch is essentially filled with a nutrient containing soil and sand, and said spherical pouch includes a flared open end formed by constricting said skin; and, b.) an elongated member vertically oriented within said soil and sand, where the lower end is pointed to facilitate penetration of said ground, an upper end flared essentially laterally to facilitate maintaining said member within said soil and sand, and a central hole in said member to receive a seed to be planted in said ground.

2. The biodegradable seed pouch according to claim 1, wherein said biodegradable skin is a biodegradable material.

3. The biodegradable seed pouch according to claim 2, wherein said biodegradable material is burlap.

4. The biodegradable seed pouch according to claim 1, wherein said seed is held within said central hole by biodegradable means.

5. The biodegradable seed pouch according to claim 1, wherein said elongated member has a length of at least 30% to about 100% of the diameter of said sphere.

6. A biodegradable seed pouch for delivery by a slow moving air craft system to the ground for germinating a seed contained therein, said pouch comprising:

a.) a biodegradable skin in the general form of a sphere, where said pouch is essentially filled with a nutrient containing soil and sand, and said spherical pouch includes a flared open end formed by constricting said skin; and, b.) a pair of generally circular planar, intersecting disks of a size comparable to said sphere, where the intersection therebetween includes a central hole to receive a seed to be planted in said ground.

7. The biodegradable seed pouch according to claim 6, wherein said intersecting disks are formed of a biodegradable material and contain nutrients for said seed.

8. The biodegradable seed pouch according to claim 7, wherein said intersecting disks are angularly disposed from 60 to 120 degrees to one another.

\* \* \* \* \*